United States Patent
Chen et al.

(10) Patent No.: US 11,743,256 B1
(45) Date of Patent: *Aug. 29, 2023

(54) SECURITY MEASURES FOR EXTENDED SESSIONS USING MULTI-DOMAIN DATA

(71) Applicant: Shape Security, Inc., Santa Clara, CA (US)

(72) Inventors: Mengmeng Chen, Mountain View, CA (US); Sumit Agarwal, Palo Alto, CA (US); Yao Zhao, Fremont, CA (US)

(73) Assignee: SHAPE SECURITY, INC., Santa Clara, CA (US)

( * ) Notice: Subject to any disclaimer, the term of this patent is extended or adjusted under 35 U.S.C. 154(b) by 135 days.

This patent is subject to a terminal disclaimer.

(21) Appl. No.: 17/087,840

(22) Filed: Nov. 3, 2020

Related U.S. Application Data

(60) Provisional application No. 62/931,203, filed on Nov. 5, 2019.

(51) Int. Cl.
*H04L 9/40* (2022.01)
*H04L 9/32* (2006.01)

(52) U.S. Cl.
CPC ............ *H04L 63/0876* (2013.01); *H04L 9/32* (2013.01)

(58) Field of Classification Search
CPC ..... H04W 12/65; H04W 12/63; H04W 12/64; H04W 12/67; H04W 12/12; H04W 12/065; H04W 4/02; H04W 4/025; H04W 76/25; H04L 41/0869; H04L 63/1433; H04L 63/0876; H04L 67/145; H04L 67/2895; H04L 2463/102; H04L 9/32; G06F 21/316; G06F 21/56; G06F 21/577
See application file for complete search history.

(56) References Cited

U.S. PATENT DOCUMENTS

| | | | |
|---|---|---|---|
| 8,959,650 B1* | 2/2015 | Richards ................. | G06F 21/44 713/153 |
| 9,271,110 B1* | 2/2016 | Fultz ...................... | H04W 4/029 |
| 10,382,416 B1* | 8/2019 | Sokolov .............. | H04L 63/1425 |
| 10,911,428 B1* | 2/2021 | Roth ..................... | H04L 9/3213 |
| 10,931,686 B1* | 2/2021 | Mehta ................. | H04L 63/1416 |
| 11,176,276 B1* | 11/2021 | Chen ....................... | G06F 21/54 |
| 2005/0278542 A1* | 12/2005 | Pierson ............... | H04L 63/0876 713/182 |
| 2006/0075110 A1* | 4/2006 | Seraphin ................. | H04L 67/14 709/227 |

(Continued)

OTHER PUBLICATIONS

Goto R. JP-2010026662-A (Feb. 4, 2010) (Year: 2010).*

*Primary Examiner* — Michael Simitoski
(74) *Attorney, Agent, or Firm* — Troutman Pepper Hamilton Sanders LLP (F5 PATENTS)

(57) ABSTRACT

A security server device, method, non-transitory computer readable medium and security system that receives request data for a request from a client to a web server system where the request comprises a session identifier (ID) for a session between an authenticated user and the web server system. A determination is made whether the client is a single-user device based on the request data and multi-domain data. Another determinations is made on whether the client is compromised based on the request data. In response to the determinations that the client is a single-user device and is not compromised an extension of the session between the authenticated user on the client and the web server system is caused.

20 Claims, 7 Drawing Sheets

(56) References Cited

U.S. PATENT DOCUMENTS

| | | | |
|---|---|---|---|
| 2007/0169170 A1* | 7/2007 | Shiran | H04L 63/1466 713/153 |
| 2008/0159318 A1* | 7/2008 | Pierlot | G06F 21/335 370/412 |
| 2013/0179489 A1* | 7/2013 | Daley | H04L 67/02 709/203 |
| 2014/0279511 A1* | 9/2014 | Steiger | G06Q 40/02 705/44 |
| 2016/0034678 A1* | 2/2016 | Chandra | G06F 21/32 726/7 |
| 2016/0044011 A1* | 2/2016 | Gordon | H04L 63/08 726/6 |
| 2016/0080367 A1* | 3/2016 | Roth | H04L 63/0846 726/9 |
| 2017/0339176 A1* | 11/2017 | Backer | H04L 63/1425 |
| 2017/0346821 A1* | 11/2017 | Yedidi | H04L 63/0876 |
| 2017/0374046 A1* | 12/2017 | Narasimhan | G06Q 20/3829 |
| 2018/0005209 A1* | 1/2018 | Ranganathan | G06Q 20/363 |
| 2018/0239883 A1* | 8/2018 | Gordon | G06F 21/316 |
| 2020/0007535 A1* | 1/2020 | Barhudarian | H04L 63/0853 |
| 2020/0220853 A1* | 7/2020 | Xu | G06F 16/955 |
| 2020/0279050 A1* | 9/2020 | Endler | G06F 16/144 |
| 2020/0396239 A1* | 12/2020 | Kaidi | H04L 63/1416 |
| 2021/0120010 A1* | 4/2021 | Chen | H04L 67/146 |

* cited by examiner

| DEVICE ID | WEBSITE | USER ID/S |
|---|---|---|
| DID1 | WS1 | UID1 |
| DID1 | WS2 | UID1 |
| DID2 | WS1 | UID2 |
| DID2 | WS3 | UID3 |
| DID3 | WS1 | UID4 |
| DID3 | WS2 | UID5 |
| DID3 | WS3 | UID4, UID6 |
UID DATA 302
FIG. 3A
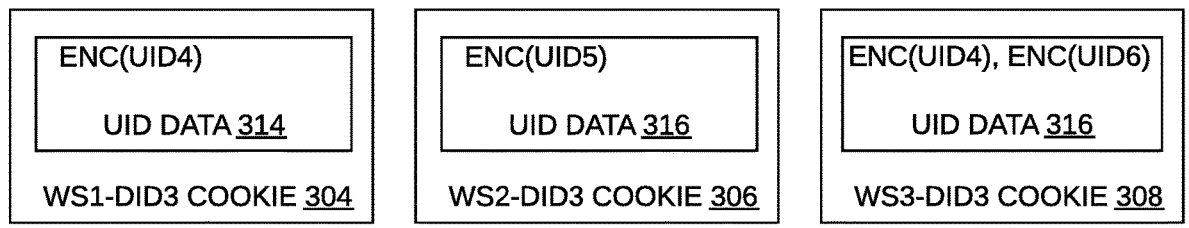
FIG. 3B
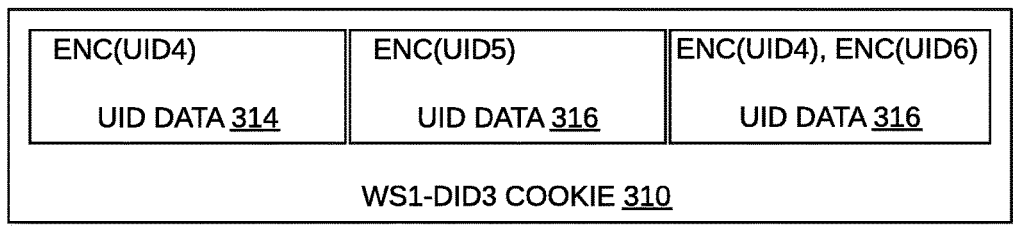
FIG. 3C

FIG. 4A

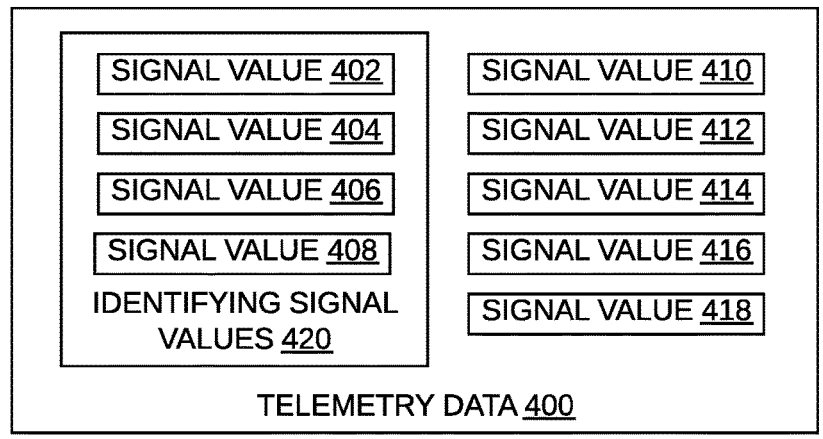

TELEMETRY DATA 400

- SIGNAL VALUE 402
- SIGNAL VALUE 404
- SIGNAL VALUE 406
- SIGNAL VALUE 408
- IDENTIFYING SIGNAL VALUES 420
- SIGNAL VALUE 410
- SIGNAL VALUE 412
- SIGNAL VALUE 414
- SIGNAL VALUE 416
- SIGNAL VALUE 418

FIG. 4B

Request 1: UID1 on Client Device A to X
Request 2: UID2 on Client Device B to Y
Request 3: UID3 on Client Device A to Y
Request 4: UID4 on Client Device A to X
Request 5: UID3 on Client Device A to Y

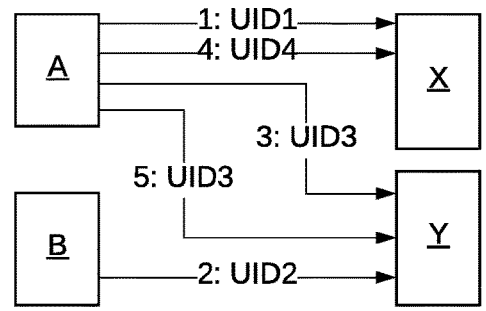

[  402,  404,  406,  408,  410,  412,  414,  416,  418  ]

IDSD1 ← [ a, b, 462 c, d,  e, f, g, h, i ]
TELEMETRY DATA 452 (Request 1)

IDSD2 ← [ a, j, 464 k, l,  e, m, g, n, i ]
TELEMETRY DATA 454 (Request 2)

IDSD1 ← [ a, b, 466 c, d,  e, o, g, h, p ]
TELEMETRY DATA 456 (Request 3)

IDSD1 ← [ a, b, 468 c, d,  e, m, g, n, i ]
TELEMETRY DATA 458 (Request 4)

IDSD1 ← [ a, b, 470 c, d,  e, m, g, n, i ]
TELEMETRY DATA 460 (Request 5)

FIG. 4C

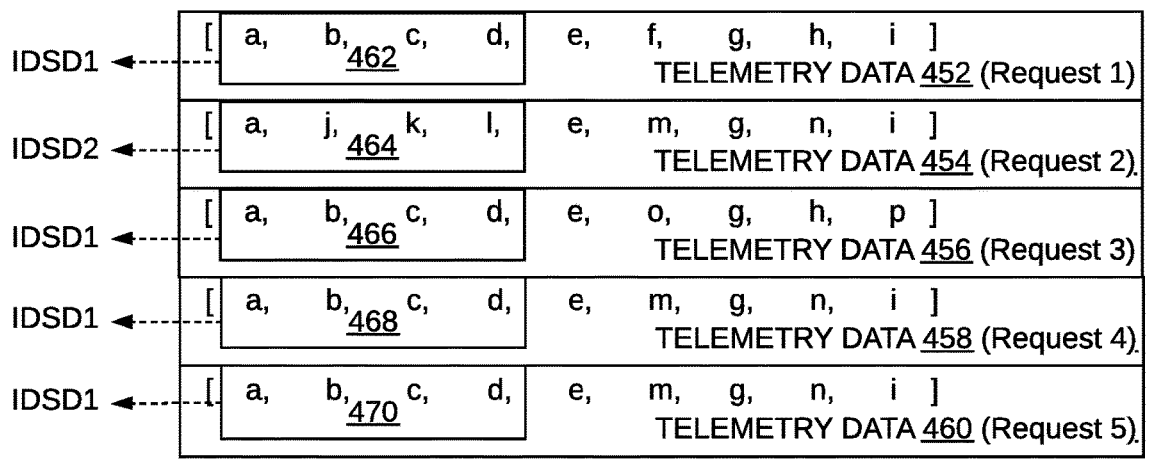

480

| DEVICE ID | WEBSITE | USER ID/S |
|---|---|---|
| IDSD1 | X | UID1, UID4 |
| IDSD2 | Y | UID2 |
| IDSD1 | Y | UID3 |

SECURITY MEASURES FOR EXTENDED SESSIONS USING MULTI-DOMAIN DATA

This application claims the benefit of U.S. Provisional Application Ser. No. 62/931,203 filed Nov. 5, 2019, which is hereby incorporated by reference in its entirety.

FIELD

This technology generally relates to security techniques applicable to client-server systems, and relates more specifically to security measures for extended sessions using multi-domain data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Web server systems often manage and store user data. For example, a web server system may maintain data for one or more user accounts. The user data may include personal data that relates to an identifiable individual, private data that a user can reasonably expect to be secured from public view, or other sensitive user data that is protected by one or more agreements, regulations, laws, or other frameworks. These frameworks may also require that the web server system secures the user data from unauthorized access. For example, attackers may use automated software that obtains and/or uses user data, such as to carry out unauthorized acts, unauthorized transactions such as financial transactions, crimes targeting the web server system, crimes targeting a user, and/or computer fraud.

User accounts, including user data, are often protected by authentication. For example, a user may be asked to enter login credentials to access a user account at a web server system. The web server system may cause a user's computing device to cache session tokens and other security-related data so that the user does not have to continuously enter her login credentials each time the user sends a request to the web server system. Typically, a web server system that aggressively prevents unauthorized account access will define very short sessions for its users. Using shorter sessions may prevent an attacker from accessing an account if a user forgets to log out of a shared or public computer. However, short sessions force users to login more frequently, which causes additional friction between the web server system and the user.

SUMMARY

A security server system includes a memory comprising programmed instructions stored thereon and one or more processors configured to be capable of executing the stored programmed instructions to receive request data for a request from a client to a web server system. The request comprises a session identifier (ID) for a session between an authenticated user and the web server system. A determination is made whether the client is a single-user device based on the request data and multi-domain data. Another determinations is made on whether the client is compromised based on the request data. In response to the determinations that the client is a single-user device and is not compromised an extension of the session between the authenticated user on the client and the web server system is caused.

A method implemented by a security system comprising one or more security server devices, web server systems, or client computing devices includes receiving request data for a request from a client to a web server system. The request comprises a session identifier (ID) for a session between an authenticated user and the web server system. A determination is made whether the client is a single-user device based on the request data and multi-domain data. Another determinations is made on whether the client is compromised based on the request data. In response to the determinations that the client is a single-user device and is not compromised an extension of the session between the authenticated user on the client and the web server system is caused.

A non-transitory computer readable medium having stored thereon instructions comprising executable code that, when executed by one or more processors, causes the processors to receive request data for a request from a client to a web server system. The request comprises a session identifier (ID) for a session between an authenticated user and the web server system. A determination is made whether the client is a single-user device based on the request data and multi-domain data. Another determinations is made on whether the client is compromised based on the request data. In response to the determinations that the client is a single-user device and is not compromised an extension of the session between the authenticated user on the client and the web server system is caused.

A security system, comprising one or more security server systems, server devices, or clients with memory comprising programmed instructions stored thereon and one or more processors configured to be capable of executing the stored programmed instructions to receive request data for a request from a client to a web server system. The request comprises a session identifier (ID) for a session between an authenticated user and the web server system. A determination is made whether the client is a single-user device based on the request data and multi-domain data. Another determinations is made on whether the client is compromised based on the request data. In response to the determinations that the client is a single-user device and is not compromised an extension of the session between the authenticated user on the client and the web server system is caused.

This technology provides a number of advantages including providing methods and systems that implement security measures for extended sessions using multi-domain data. With examples of this technology, a web content provider may implement effective security measures while still reducing negative impacts caused by increased user friction, such as decreased usage and/or incomplete transactions. Examples of this technology enable a web content provider to better and more simply protect its users and itself from fraudsters. Additionally, exemplary implementations of this technology can be added with minimal modification by the web content provider to hardware or software on its own server systems. Further, with examples of this technology security code and/or systems can be provided flexibly by an organization that specializes in web security, which can in turn keep the security code updated to address ever-changing security threats. In particular, with such examples a security organization can aggregate data received across many entities that operate many domains, including telemetry data and/or analyzed telemetry data and effectively use such aggregated data to generate countermeasures that are more effective than countermeasures that could be developed using only data from a single domain. Additional features and advantages are apparent from the specification and the drawings.

BRIEF DESCRIPTION OF THE DRAWINGS

FIG. 3A is a diagram of an example of UID data maintained by a security server system for implementing security measures;

FIGS. 3B-3C are diagrams of examples of encrypted UID data stored in different cookies or combined in a cookie:

FIG. 4A is a diagram of an example of telemetry data;

FIG. 4B is a diagram of telemetry data and IDSD for a set of interactions;

FIG. 4C is a diagram of an example of UID data;

Figure 1:
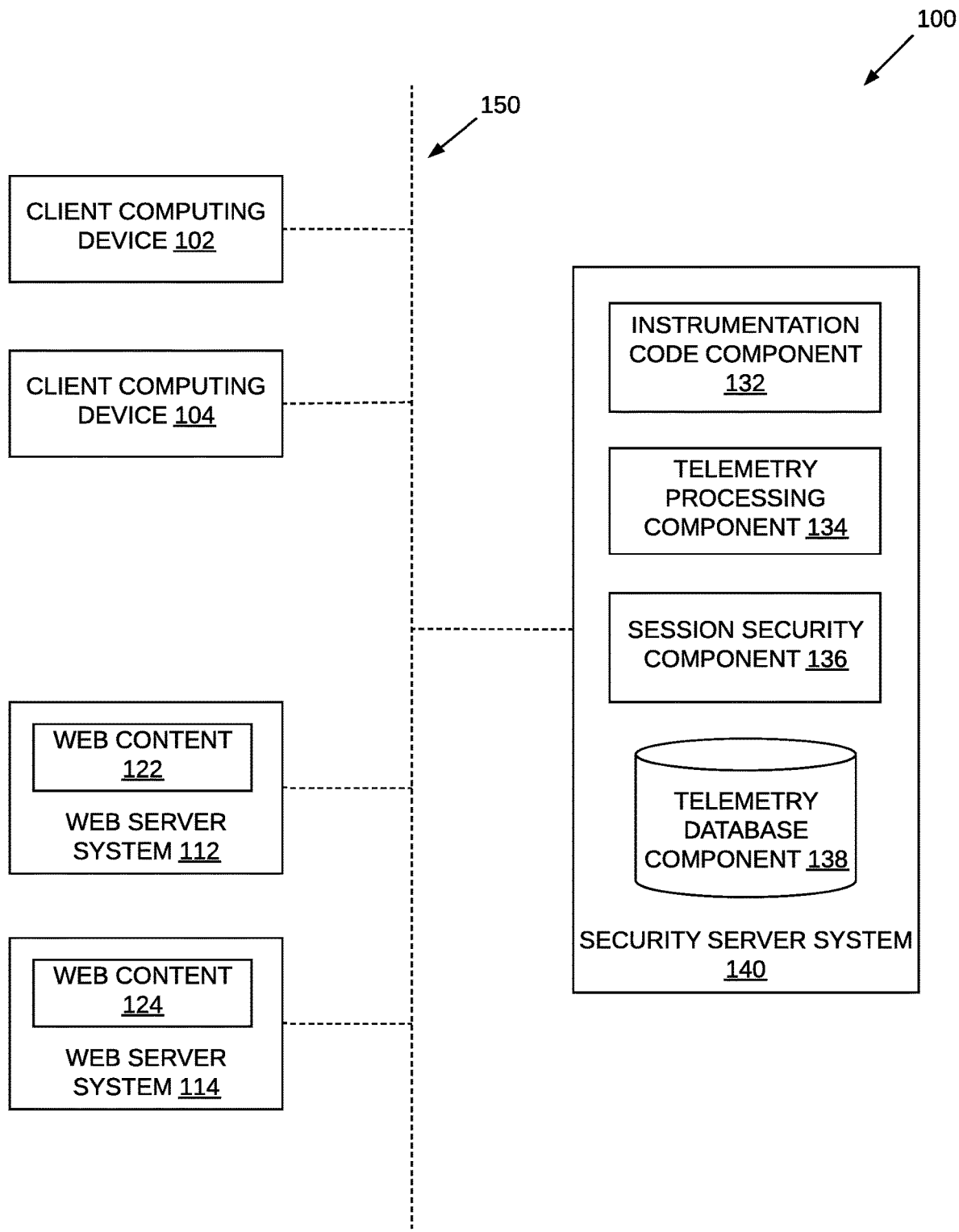
FIG. 1 is a block diagram of an exemplary computer system or environment that includes an example of a security server system or device that implements security measures for extended sessions using multi-domain data.

While each of the drawing figures illustrates a particular example for purposes of illustrating a clear example, other examples may omit, add to, reorder, or modify any of the elements shown in the drawing figures. For purposes of illustrating clear examples, one or more figures may be described with reference to one or more other figures, but using the particular arrangement illustrated in the one or more other figures is not required in other examples.

DETAILED DESCRIPTION

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

It will be further understood that: the term "or" may be inclusive or exclusive unless expressly stated otherwise; the term "set" may comprise zero, one, or two or more elements; the terms "first", "second", "certain", and "particular" are used as naming conventions to distinguish elements from each other and does not imply an ordering, timing, or any other characteristic of the referenced items unless otherwise specified; the terms "such as", "e.g.", "for example", and the like describe one or more examples but are not limited to the described example(s); the terms "comprises" and/or "comprising" specify the presence of stated features, but do not preclude the presence or addition of one or more other features.

A "computer system" refers to one or more computers, such as one or more physical computers, virtual computers, and/or computing devices. As an example, a computer system may be, or may include, one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to a "computer system" herein may mean one or more computers, unless expressly stated otherwise. When a computer system performs an action, the action is performed by one or more computers of the computer system.

A "client" refers to a combination of integrated software components and an allocation of computational resources, such as memory, a computing device, and processes on a computing device for executing the integrated software components. The combination of the software and computational resources are configured to interact with one or more servers over a network, such as the Internet. A client may refer to either the combination of components on one or more computers, or the one or more computers.

A "server" (also referred to as "server system" or "server computer system") refers to a combination of integrated software components and an allocation of computational resources, such as memory, a computing device, and processes on the computing device for executing the integrated software components. The combination of the software and computational resources provide a particular type of function on behalf of clients of the server. A server may refer to either the combination of components on one or more computers, or the one or more computers. A server may include multiple servers; that is, a server may include a first server computing device and a second server computing device, which may provide the same or different functionality to the same or different set of clients.

General Overview

This document generally describes systems, methods, devices, and other techniques for security measures for extended sessions using multi-domain data. An entity that operates a web server system may wish to extend sessions for users, such as to reduce user friction and/or to increase the likelihood that a user chooses its services. Sessions are extended for authenticated users based on collected telemetry data from multiple domains. For example, telemetry data may be collected when a user visits different websites or otherwise accesses web content from different web server systems. The collected telemetry data is used to ensure one or more security factors are met. The security factors may include determining, based on the telemetry data, that the authenticated user is using a client computing device that is single-user device with respect to a plurality of web server systems. The security factors may also include determining, based on the telemetry data, that the client computing device is not compromised.

In some examples, a computer system receives request data is received for a request from a client computing device to a web server system. The computer system determines, based on the request data, that the client computing device is a single-user device and/or that the client computing device is not compromised. In response to determining that the client computing device is a single-user device and that the client computing device is not compromised, the computer system causes extension of the session between the authenticated user on the client computing device and the web server system.

In some examples, a security server system performs security measures for extended sessions using multi-domain data for a plurality of web server systems. The security server system may be separate from the web server systems.

Alternatively and/or in addition, the security measures may be performed by a security server system that is implemented partially or fully within one or more of the web server systems. A security server system may process personal data for a particular web server system in accordance with one or more agreements, regulations, laws, or other frameworks.

The various techniques described herein may achieve one or more of the following advantages: a web content provider may reduce user friction for legitimate users; in particular, the web content provider may reduce negative impacts caused by increased user friction such as decreased usage and/or incomplete transactions; the web content provider may better protect its users and itself from fraudsters; such features may be provided relatively simply for the web content providers in certain implementations; in particular implementations, such features can be added with minimal modification by the web content provider to hardware or software on its own server systems; security code and/or systems can be provided flexibly by an organization that specializes in web security, which can in turn keep the security code updated to address ever-changing security threats; such a security organization can also aggregate data received across many entities that operate many domains, including telemetry data and/or analyzed telemetry data; such a security organization can use such aggregated data to generate countermeasures that are more effective than countermeasures that could be developed using only data from a single domain. Additional features and advantages are apparent from the specification and the drawings.

System Overview

An exemplary computer system 100 with an example of a security server system 140 (also referred to herein as a security server device) that implements security measures for extended sessions using multi-domain data is illustrated in FIG. 1. In this example, the computer system 100 includes a plurality of web server systems 112-114, a plurality of client computing devices 102-104, and the security server system 140, although the system 100 could include other types and/or numbers of other systems, devices, and/or other elements in other configurations. The client computing devices 102-104, web server systems 112-114 and security server system 140 communicate over one or more networks 150. The network(s) 150 may include one or more local area networks (LANs) and/or one or more wide area networks, such as the Internet. The network arrangement and connectivity between the client computing devices 102-104, the web server systems 112-114 and the security server system 140 may vary. Example arrangements are described in greater detail hereinafter.

In this example, The web server systems 112-114 host web content 122-124, respectively, making the web content 122-124 available to one or more of the client computing devices 102-104. For example, the web content 122-124 may include one or more web pages, images, audio, video, messages, files, data, scripts, services, application content, and other content available over the network(s) 150. In some examples, the web content 122-124 includes any data, instructions, or other content provided by the web server systems 112-114 over the Internet, such as one or more responses to requests from one or more of the client computing devices 102-104. For ease of illustration and description, some example(s) herein are described with respect to one of the client computing devices 102-104 or client computing device 502 (e.g. client computing 102), which, unless otherwise specified, may apply to another client computing device (e.g. client computing device 104). Similarly, some example(s) herein are described with respect to one of the web server systems 112-114 (e.g. web server 112) or one of the web server systems 512-514 (e.g. web server system 512), which, unless otherwise specified, may apply to another web server (e.g. web server 114 or web server 514). Further, some example(s) herein are described with respect to one of the security server systems (e.g. security server system 140 or security server system 540), which, unless otherwise specified, may apply to other security server systems (e.g. security server system 540).

As used herein, the term "website" refers to a collection of web pages, web resources, and other web content made available over the Internet. For example, a first website may include web content 122 hosted by web server system 112, while a second website may include web content 124 hosted by web server system 114. Often, the web content of a website shares a single domain name or set of related domain names that are owned or controlled by a common entity. A website may include web page content accessible over the Internet through a browser, and/or web content that is accessible over the Internet from another client application. Such applications may include web applications executing in a browsers, and/or native applications installed on the client computing devices 102-104.

The web server systems 112-114 may maintain user accounts for one or more users of the web server systems 112-114. A user account may be associated with data, including private and/or personal data for the corresponding user. For example, a particular user may access their account at a particular web server system 112 through authentication, such as by providing a username and password or other credentials so that the web server system 112 can verify the user's identity.

Security Server System

In this example, the security server system 140 implements security measures for extended sessions between the web server systems 112-114 and one or more client computing devices 102-104 using multi-domain data. As used herein, the term "multi-domain data" refers to data regarding a plurality of domains, such as data maintained for a first website and a second website, data maintained for a first web server system 112 and a second web server system 114, and the like. In some examples, the security server system 140 receives request data for requests from one or more of the client computing devices 102-104 to the web server systems 112-114. Request data describing a particular request may for example include the request, portions of the request, and/or other data relating to the request.

In some examples, the request and/or request data includes a session identifier (ID) for a session between an authenticated user using, for example, a particular client computing device 102 and a particular web server system 112, although the session may for example be between other client computing devices and web servers. As used herein, the term "authenticated user" refers to a user that has successfully authenticated in this example to the web server system 112, such as by logging in to the web server system 112 using a username and password and/or other means of authentication, such as but not limited to hardware tokens, biometric authentication, social authentication, two-factor authentication, and/or other forms of authentication. The security server system 140 may determine, based on the request data, that security criteria are met for extending in this example the session between the authenticated user on the client computing device 102 and the web server system 112.

In some examples, the security server system 140 includes an instrumentation code component 132, a telemetry processing component 134, a session security component 136, and a telemetry database component 138, although the system may include other types and/or numbers of other components or other elements. The security server system 140 and/or its components (e.g. instrumentation code component 132, telemetry processing component 134, session security component 136, and/or telemetry database component 138) are presented herein as individual components for ease of explanation; any action performed by or to one or more components of the security server system 140 may be considered performed by or to the security server system 140. The security server system 140 and/or its components may be implemented as one or more dependent or independent processes, and may be implemented on one or multiple computers; for example, a component may be implemented as a distributed system; alternatively and/or in addition, multiple instances of one or more components may be implemented. Furthermore, a component shown may be implemented fully and/or partially in one or multiple programs and/or processes, and two or more components shown may be implemented fully and/or partially in the same program and/or process.

Single-User Device

In this example, the security server system 140 may consider whether the one of the client computing devices 102-104 is a single-user device when determining whether to extend a session between an authenticated user on the one of the client computing devices 102-104 and one of the web server systems 112-114. In some examples, the one of the client computing devices 102-104 is a single-user device if only one authenticated user has logged in from the one of the client computing devices 102-104 to each of a plurality of web server systems 112-114 during a time period.

The time period may include a period that a security server system 140 has been monitoring interactions between the client computing devices 102-104 and the plurality of web server systems 112-114. In some examples, the time period may include a particular amount of time, such as the most recent year or a most recent number of days. The security server system 140 may determine that the risk for extending the session is low based at least in part on determining that the one of the client computing devices 102-104 is a single user device. The particular amount of time may be indefinite, based on the amount of time a session is valid, or chosen by personnel operating the one or more of the web server systems 112-114 or the security server system 140.

In some examples, if more than one authenticated user has logged in to one of the web server systems 112-114 from a particular client computing device, such as client computing device 102 by way of example, during the time period, then the particular client computing device 102 is not a single-user device. In some examples, the client computing device 102 is classified in another category based at least in part on the number of authenticated users that have logged in during the time period. For example, a client computing device, such as a client computing device 102 by way of example, may be classified as a shared device, a public device, or another device category based on the number of authenticated users that have logged in to the web server systems 112-114 from the one client computing device 102, such as client computing device 102 by way of example, during the time period.

In this example, the security server system 140 may consider authenticated users that have logged in to any web server system 112-114 or a specified set of web server systems 112-114 (i.e. the web server systems 112-114 may represent more than two web server systems and similarly the client computing devices 102-104 may represent more than two client computing device) from one of the client computing devices, such as client computing device 102 by way of example. When the security server system 140 monitors a plurality of web server systems 112-114 in this example, the security server system 140 may determine whether two or more users have used a particular client computing device, such as client computing device 102 by way of example, to access any specified set of one or more web server systems 112-114 monitored by the security server system 140.

The security server system 140 may have a flexible definition for determining a single-user device when implementing security measures for session extension. For example, when protecting different web server systems 112-114, the security server system 140 may use the same or different set of web server systems 112-114, time periods, or other parameters when determining whether a client computing device is a single-user device.

Compromised Device

The security server system 140 may consider whether a client computing device, such as a client computing device 102 by way of example, is a compromised device when determining whether to extend a session between an authenticated user on the client computing device 102 and a web server system, such as web server system 112 by way of example. For example, the security server system 140 may find indicia of compromise when evaluating telemetry data collected at the client computing device 102. An indicia of compromise indicates a security risk associated with the client computing device 102.

Example indicia of compromise include detection of non-human behavior at the client computing device 102, detection of software controlling the client computing device 102, determining that an IP, ASN, or other information associated with the client computing device 102 is associated with non-human behavior or attacks, and/or detecting other features indicating that a client computing device, such as a client computing device 102 by way of example, may be compromised. For example, the security server system 140 may determine that a client computing device, such as client computing device 102 by way of example) is compromised when the security server system 140 determines that the client computing device 102 in this example is controlled by automated software. In some examples, the indicia of compromise include determining whether one or more tokens, cookies, or other browser data submitted in association with a request have been tampered with at the client computing device, such as client computing device 102 by way of example.

In some examples, when the security server system 140 receives request data for a request from a client computing device, such as client computing device 102 by way of example, to a web server system, such as web server system 112 by way of example, the security server system 140 may provide instrumentation code that collects telemetry data at the client computing device 102 in this example when the instrumentation code is executed at the client computing device 102. The security server system 140 may receive the telemetry data collected at the client computing device 102 and analyze the telemetry data to determine whether the client computing device 102 is compromised before extending the session in response to the request. For example, the security server system 140 may evaluate telemetry data collected at the client computing device 102 in this example to determine whether a legitimate human user is attempting to access the authenticated user's account at the web server system 112 in this example.

In some examples, the security server system 140 uses prior telemetry data collected at the client computing device, such as client computing device 102 by way of example, to determine whether the client computing device 102 in this example is compromised when determining whether to extend the session in response to the request. For example, the security server system 140 may have previously set a security cookie at the client computing device 102 after analyzing telemetry data collected in association with a prior interaction to determine that the client computing device 102 is not compromised. When processing the current request, the security server system 140 may determine that that the client computing device 102 in this example is not compromised based on the presence of a valid security cookie in the request and/or the request data.

Instrumentation Code

The security server system 140 may use instrumentation code to collect telemetry data at the client computing devices 102-104. The security server system 140 may use the collected telemetry data from a client computing device, such as client computing device 102 by way of example, to determine one or more security factors, such as whether in this example a client computing device, such as a client computing device 102 by way of example, is a single-user device and/or whether the client computing device 102 is compromised. For example, the instrumentation code component 132 may provide instrumentation code to collect telemetry data about particular signals at the client computing device, such as client computing device 102 by way of example. The particular signals may be analyzed to determine whether the client computing device 102 in this example is a single-user device and/or to detect an indicia of compromise.

As used herein, the term "instrumentation code" refers to source code, bytecode, binary software, or other computer code that is executed on a computer to collect telemetry data at the computer. For example, instrumentation code may be JavaScript that collects and/or otherwise generates data on a client computing device, such as a client computing device 102 by way of example, referred to herein as telemetry data. The instrumentation code may also include instructions to send the telemetry data to a server, such as the security server system 140 and/or the web server system, such as the web server system 112 by way of example. In some examples, the instrumentation code includes instructions to send collected telemetry data to a server over one or more requests. For example, the security server system 140 may receive the telemetry data directly from the client computing device 102 or indirectly via one or more other computers, such as the web server systems 112-114.

In some examples, the instrumentation code component 132 provides instrumentation code to a client computing device, such as a client computing device 102 by way of example, when the client computing device 102 interacts with a web server system, such as web server system 112 by way of example. For example, the instrumentation code component 132 may provide instrumentation code for execution at a client computing device, such as a client computing device 102 by way of example, when the client computing device 102 requests web content 122 from the web server system 112. In some examples, the interaction may include a user interacting with an application on the client computing device 102, such as a web application or a native application installed on a computer or a mobile device.

In some examples, the security server system 140 provides instrumentation code to collect telemetry data during one or more particular interaction types. For example, the instrumentation code component 132 may provide instrumentation code to one or more of the client computing devices 102-104 when a client computing device, such as a client computing device 102 by way of example, requests to log in to a web server system, such as web server system 112 by way of example. The instrumentation code component 132 may provide instrumentation code for one or more specific transaction types, such as login transactions, other authentication transactions, purchase transactions, financial transactions, data submission, account creation, and/or other transaction types. An interaction for which the security server system 140 collects telemetry data using instrumentation code is also referred to herein as a monitored interaction.

In some examples, the instrumentation code component 132 provides different instrumentation code in different situations. For example, the instrumentation code component 132 may provide different instrumentation code to clients of different web server systems 112-114. In some examples, the instrumentation code component 132 provides different instrumentation code for different client computing devices 102-104. For example, different instrumentation code may be provided when client computing devices 102-104 are running different browsers, operating systems, or other software (including different versions thereof), or when the security server system 140 determines that client computing devices 102-104 pose a different amount or type of security risk.

The instrumentation code may be provided in different formats. For example, the instrumentation code may include JavaScript code, and/or other web code that executes in a browser or other JavaScript engine at the client computing device 102. In some examples, the instrumentation code may include bytecode, such as JavaScript bytecode. The instrumentation code may be provided with web code requested by the client computing device 102. In some examples, the instrumentation code may be obfuscated to prevent an attacker from understanding the instrumentation code, and/or integrated with the web code to prevent execution of the web code without execution of the instrumentation code.

In some examples, at least a portion of the instrumentation code is provided in an application installed at the client computing device 102 by providing a Software Development Kit (SDK) to a developer of the application. When the application at a client computing device, such as a client computing device 102 by way of example, interacts with the application server of the corresponding web server system 112-114, the application may interact with the instrumentation code component 132, such as by sending telemetry data and/or obtaining additional instrumentation code for execution at the client computing device 102.

Telemetry Data

The telemetry processing component 134 receives and processes telemetry data collected at the client computing devices 102-104. In some examples, the telemetry processing component 134 maintains a telemetry data set that includes telemetry data collected for a plurality of interactions between client computing devices 102-104 and web server systems 112-114. For example, the telemetry processing component 134 may store the telemetry data set in a telemetry database component 138 that is accessible to other components of the security server system 140 to implement security measures for extended sessions using multi-domain data.

The instrumentation code may collect telemetry data about particular signals at one or more client computing devices 102-104. As used herein, the term "signal" refers to a specific type of data to collect at a client computing device, such as a client computing device 102 by way of example, such as a particular property and/or aspect of: a computing environment at the client computing device 102, one or more operating states of the client computing device 102, one or more operations performed at the client computing device 102, user interaction at the client computing device 102, and/or other properties and/or aspects the client computing device 102. As used herein, the term "signal value" refers to a value for a signal (e.g. the specific type of data) at a client computing device, such as a client computing device 102 by way of example, as detected by the instrumentation code. For example, a signal may be an IP address, while a signal value collected at the client computing device 102 is the IP address of the client computing device 102 (e.g. 123.456.78.9). Other signals may include network properties, operating system properties, browser properties, installed software properties, display size, other hardware properties, device configuration properties, information about execution of web code or other web content, information about processing of web content, information about human or software interactions with the web content, information about user inputs at the client computing device 102, and other signals that are collectable when the instrumentation code is executed at the client computing device 102. In some examples, a different number of signals may be collected for different transactions.

Extending a Session

A session is a temporary and interactive information interchange between two or more communicating devices, such as a client computing device (e.g. client computing device 102) and a web server system (e.g. web server system 112). A session is established at a certain point in time, and may be brought to an end at a later point in time. In session-based authentication, after a user on a client computing device, such as a client computing device 102 by way of example, is authenticated, the web server system 112 in this example provides a session identifier (ID). For example, the session ID may be stored in a cookie set by the web server system 112 at the client computing device 102. Alternatively, the techniques described herein may also be applied using a session token created by the web server system 112 and provided to the client computing device 102. Unless otherwise specified, the term "session ID", as used herein, refers to a session ID stored in a cookie, or another unique identifier for a session, including but not limited to a session token.

In this example, the client computing device 102 may attach the session ID to subsequent requests. For example, the client computing device 102 may send a session token or a cookie comprising the session ID with subsequent requests to the web server system 112. At end of the session, the web server system 112 in this example destroys the session, such as by clearing a cookie at the client computing device 102, invalidating a session token, or otherwise rendering the session ID unusable by the client computing device 102 to continue a session involving the authenticated user. A session ID and/or cookie containing a session ID may have an expiration time. After the expiration time, the session ID is no longer usable to continue the session between the authenticated user on the client computing device 102 and the web server system 112 in this example.

Figure 2:
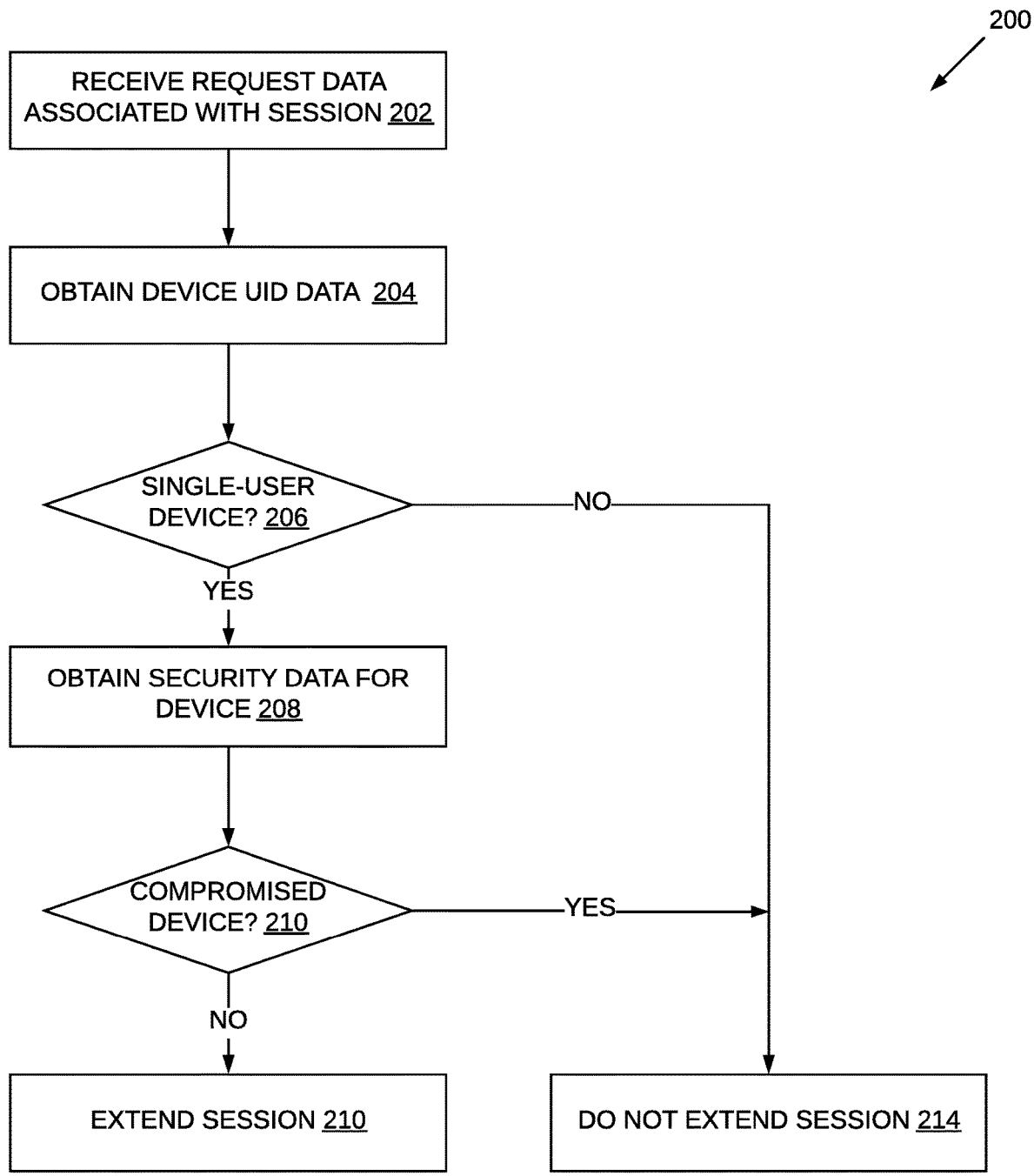
FIG. 2 is a flow chart of an example of a method for implementing security measures for extended sessions using multi-domain data.

FIG. 2 is a flow chart of an example of a method for implementing security measures for extended sessions using multi-domain data. Process 200 may be performed by one or more computing devices and/or processes thereof. In some examples, one or more steps of process 200 are performed by a security server system (e.g. security server system 140 or security server system 540). Process 200 will be described with respect to the security server system 140, a client computing device, such as a client computing device 102 by way of example, and two or more web server systems 112-114, but is not limited to performance by such.

At step 202, the security server system 140 receives request data for a request from a client computing device, such as a client computing device 102 by way of example, to a web server system, such as web server system 112 by way of example. The request data may include a session identifier (ID) for a session between an authenticated user and the web server system 112.

At step 204, the security server system 140 obtains user identifier (UID) data, such as but not limited to one or more usernames, corresponding to one or more users that have used the client computing device 102 in this example to access two or more web server systems 112-114. The UID data corresponds to one or more authenticated users that have successfully logged in or otherwise authenticated with the web server systems 112-114 from the client computing device 102. Management and storage of UID data is described in greater detail hereinafter.

At decision step 206, the security server system 140 determines whether the client computing device 102 in this example is a single-user device based at least in part on the UID data for the web server systems 112-114. If the client computing device 102 is not a single-user device, processing continues to step 214, where the security server system 140 does not extend a session. Otherwise, if the client computing device 102 in this example is a single-user device, processing continues to step 208.

At step 208, the security server system 140 obtains security data for the client computing device 102 in this example. In some examples, the security data includes telemetry data collected at the client computing device 102. The telemetry data may be provided to the security server system 140 as part of the request data. For example, the telemetry data may be received with the request, as part of the request, or before the request.

At decision step 210, the security server system 140 determines whether the client computing device 102 in this example is compromised. In this example, the security server system 140 may determine whether the client computing device 102 is compromised based on the telemetry data or other security data. If the client computing device 102 is compromised, processing continues to step 214, where the security server system 140 does not extend a session. Otherwise, if the client computing device 102 is not compromised, processing continues to step 210.

At step 210, the security server system 140 causes the session between the authenticated user on the client computing device 102 and the web server system 112 to be extended. For example, the security server system 140 may provide an indication to the web server system 112 that the security server system 140 has determined that the session should be extended. In some examples, the security server system 140 provides an indication to the web server system 112 that the client computing device 102 is a single-user device, that the client computing device 102 is not compromised, and/or other determinations made by the security server system 140. The web server system 112 may extend the session based on receiving one or more indications from the security server system 140.

In some examples, the security server system 140 may implement an application programming interface (API) that allows a web server system, such as web server system 112 by way of example, to make an API call regarding a particular client computing device 102. For example, the web server system 112 may use an API call to submit request data corresponding to a session, obtain a recommendation on whether the session should be extended, obtain information on whether a client computing device, such as a client computing device 102 by way of example, is a single-user device, obtain information on whether a client computing device, such as a client computing device 102 by way of example, is compromised, and/or other functionality implemented in the API.

In some examples, the security server system 140 receives a request on behalf of a web server system, such as web server system 112 by way of example. The request may include telemetry data collected at the client computing device 102. After processing the request, the security server system 140 may decorate the request with a security value that indicates whether or not the web server system 112 should extend a current session with an authenticated user on the client computing device 102 without requiring the authenticated user to log in or otherwise reauthenticate. The security server system 140 may forward the decorated request to the web server system 112 for processing. When the web server system 112 processes the decorated request, the web server system 112 may extend the session.

In some examples, extension of a session includes issuing a new session cookie for the authenticated user at the client computing device with a new expiration date. Alternatively and/or in addition, extension of a session may include setting a new expiration date for an existing session cookie for the authenticated user at the client computing device. The session cookie may be set or modified by the web server system 112 and/or the security server system 140 in one or more examples.

Maintaining Stored User ID (UID) Data by the Security Server System

In some examples, the security server system (e.g. security server system 140 or security server system 540) manages and stores UID data for multiple domains, websites, and/or web server systems (e.g. web server systems 112-114). The security server system uses the multi-domain UID data to determine whether a client computing device (e.g. client computing devices 102-104) is a single-user device.

FIG. 3A illustrates an example of UID data maintained by a security server system (e.g. security server system 140 or security server system 540) for implementing security measures. In this example, the UID data 302 includes data describing a plurality of requests, although other data may be maintained. For example the UID data 302 may include data describing logins by users using particular client computing devices to a plurality of web server systems. In other examples, the UID data 302 may include one or more records that include a device identifier (ID), a website, and one or more user IDs that have logged in or otherwise authenticated with the website from the client computing device corresponding to the device ID. In some examples, the security server system 140 may assign a unique device ID to each unique one of the client computing devices 102-104. The assigned device ID may be deidentified and/or anonymized to remove identifying information.

In some examples, a unique device ID is assigned to each user agent. A user agent is software executing on one of the client computing device 102-104, such as a browser, a web-enabled application, or other software and/or hardware that interacts with a web server system monitored by the security server system. In some implementations, individual user agents operating on the same client computing device are treated as unique client computing devices. One or more examples describing unique client computing devices may be equally applicable to unique user agents operating on the same client computing device and/or different client computing devices.

In some examples, the security server system 140 issues a cookie to one of the client computing devices 102-104 comprising the device ID. For example, the device ID may be included in a session cookie or another cookie. In this example, the one of the client computing devices 102-104 submits the cookie and/or the device ID with a request. When the request is a login request by a particular user to a particular website from the one of the client computing devices 102-104, the security server system 140 may store a UID corresponding to the particular user in association with the device ID and the website in the UID data 302. The UID stored in the UID data 302 may be the actual username for the user's account at the web server system, or another identifier that uniquely identifies the user. For example, a function, such as but not limited to a hash function and/or encryption function, may be applied to the username to generate the UID.

UID data 302 may for example include login data from three different client computing devices for three different websites. For a first one of the client computing devices 102-104 assigned a device ID DID1, the UID data 302 indicates that one authenticated user UID1 successfully logged in to website WS1, and one authenticated user UID1 successfully logged in to website WS2 from device DID1. For a second one of the client computing devices 102-104 assigned a device ID DID2, the UID data 302 indicates that one authenticated user UID2 successfully logged in to website WS1, and one authenticated user UID3 successfully logged in to website WS3 from device DID2. For a third one of the client computing devices 102-104 (client computing devices 102-104 may represent more than two client computing devices) assigned a device ID DID3, the UID data 302 indicates that one authenticated user UID4 successfully logged in to website WS1, one authenticated user UID5 successfully logged in to website WS2, and two authenticated users UID4 and UID6 successfully logged in to website WS3 from device DID3.

In some examples, one of the client computing devices 102-104 is a single-user device if only one authenticated user has logged in from one of the client computing devices 102-104 to each of a plurality of web server systems, such as web server systems 112-114 by way of example. Based on the UID data 302, client computing device DID1 is a single-user device, DID2 is a single-user device, and DID3 is not a single-user device. In some examples, the security server system 140 may not cause session extension for a user of device DID3 on any website because more than one authenticated user has successfully logged in from device DID3 to website WS3. For example, the security server system 140 may indicate, to a web server system, such as one of the webs server systems 112-114, that operates website WS2, that a session for user UID5 should not be extended based on determining that DID3 is not a single-user device based on detecting multiple authenticated users for website WS3 and device DID3.

In some examples, the security server system, such as security server system 140 or 540 by way of example, maintains and/or stores UID data 302. For example, in FIG. 5, a security server system 540 (also referred to herein as a security server device) stores UID data 536 for a plurality of web server systems 512-514.

Storing Encrypted User ID (UID) Data in a Cookie

In some examples shown in FIGS. 3B-3C, encrypted UID data is stored in a cookie at the client computing device (e.g. one of the client computing devices 102-104), such as UID Data 314 comprising encrypted (UID4) stored in WS1-D1D3 cookie 304, UID Data 316 comprising encrypted (UID5) stored in WS1-D1D3 cookie 306, UID Data 316 comprising and encrypted (UID4) and encrypted (UID6) stored in WS1-D1D3 cookie 306 as shown for example in FIG. 3B or UID Data 314 comprising encrypted (UID4), UID Data 316 comprising encrypted (UID5), and UID Data 316 comprising encrypted (UID4) and encrypted (UID6) stored in WS1-D1D3 cookie 310. In this example, the security server system (e.g. security server system 140 or security server system 540) evaluates the encrypted UID data in the cookie received from the client computing device (e.g. one of the client computing devices 102-104) to determine whether the client computing device is a single-user device.

Identifying Signal Data (IDSD)

In some examples, a security server system (e.g. security server system 140 or security server system 540) determines whether a client computing device (e.g. one of the client computing devices 102-104 or client computing device 502) is a single-user device with respect to a web server system (e.g. one of the web server systems 112-114 or web server systems 512-514) by generating identifying signal data (IDSD) for a request from the client computing device to the web server system. An IDSD can be generated or otherwise determined based on request data and/or telemetry data received from the client computing device involved in the request or other interaction.

FIG. 4A illustrates an example of telemetry data. The telemetry data 400 is generated at a client computing device (e.g. one of the client computing devices 102-104 or client computing device 502) when instrumentation code provided by a security server system (e.g. security server system 140 or security server system 540) is executed at the client computing device (e.g. one of the client computing devices 102-104 or client computing device 502). The telemetry data 400 includes a plurality of signal values 402-418. Instrumentation code executing at a client computing device (e.g. one of the client computing devices 102-104 or client computing device 502) can collect signal values 402-418 for a set of specified signals. For example, the instrumentation code may collect a display size signal of the corresponding client computing device (e.g. one of the client computing devices 102-104 or client computing device 502), and the reported signal value 402 for the display size signal may indicate dimensions of a display of the corresponding client computing device, such as 1440×4560 pixels. In some examples, a security server system (e.g. security server system 140 or security server system 540) may determine one or more signals from the request data. For example, a signal may be an IP address, and the signal value may be the IP address associated with the request.

The telemetry data 400 may include identifying signal values 420 for a set of one or more identifying signals. The identifying signals are selected such that the identifying signal values 420 are expected to uniquely identify the client computing device (e.g. one of the client computing devices 102-104 or client computing device 502) and/or a particular user on the client computing device corresponding to the telemetry data 400. The identifying signal values 420 include at least a subset of the signal values 402-418 in the telemetry data 400. For example, the identifying signal values 420 include four signal values 402-408. The telemetry data 400 may include other signal values 410-418 that are not included in the identifying signal values 420. In some examples, the telemetry data 400 may include only the identifying signal values 420.

The security server system (e.g. security server system 140 or security server system 540) may generate identifying signal data (IDSD) corresponding to the interaction based on the corresponding telemetry data. The IDSD for an interaction may include one or more identifying signal values 420, one or more derived values that generated based on one or more identifying signal values 420, or a combination thereof. In some examples, the IDSD is the unprocessed identifying signal values 420 for the set of identifying signals. Alternatively and/or in addition, the IDSD may be determined by processing one or more of the identifying signal values 420. For example, a deterministic function, such as a hash or another function, may be applied to the identifying signal values 420 to generate the IDSD. In some examples, a telemetry database component (e.g. telemetry database component 138) stores processed IDSDs in the telemetry data set in association with the telemetry data.

The security server system (e.g. security server system 140 or security server system 540) may implement security measures for extended sessions using a set of identifying signals that is selected to distinguish different client computing devices with a high probability. That is, in some cases, a different client computing device may generate telemetry data with the same IDSD. The identifying signals may also be selected so that the IDSD distinguishes a characteristic other than the client computing device associated with the telemetry data. For example, the identifying signals may be selected to generate an IDSD that distinguishes a particular individual or user on the client computing device.

In some examples, the identifying signals are selected to distinguish different user agents operating on a particular client computing device, such as a first browser, a second browser different from the first browser, or a particular application. For example, the telemetry data collected using the first browser may have a different IDSD than telemetry data collected using the second browser. In some examples, the identifying signals are selected such that different user agents operating on a particular client computing device are not distinguished. For example, telemetry data collected using the first browser and telemetry data collected using the second browser will both generate the same IDSD.

In some examples, the identifying signal values 420 are collected for identifying signals that are expected to be static and/or infrequently changing on the client computing device, such as a display size, an operating system type, and/or another static or infrequently changing signal. When an infrequently changing signal is used, a transaction by the same client computing device (e.g. one of the client computing devices 102-104 or client computing device 502) may have telemetry data that generates a different IDSD than a prior transaction. However, the change in IDSD is expected to happen infrequently, and the client computing device will develop a newer transaction history with the newer IDSD.

Using IDSD to Generate UID Data

In some examples, IDSD are used to identify client computing devices. For example, a security server system (e.g. security server system 140) may generate an IDSD for one or more interactions between a web server system (e.g. one of the web server systems 112-114 or web server systems 512-514) and a particular client computing device (e.g. one of the client computing devices 102-104 or client computing device 502).

FIG. 4B illustrates an example of telemetry data and IDSD for a set of interactions. In this example, the telemetry data is shown for a set of interactions that include Requests 1-5. Request 1 corresponds to an interaction between an authenticated user UID1 and Web Server System X from Client Device A. Request 2 corresponds to an interaction between an authenticated user UID2 and Web Server System Y from Client Device B. Request 3 corresponds to an interaction between an authenticated user UID3 and Web Server System Y from Client Device A. Request 4 corresponds to an interaction between an authenticated user UID4 and Web Server System X from Client Device A. Request 5 corresponds to an interaction between authenticated user UID3 and Web Server System Y from Client Device A.

Telemetry data 452-460 corresponds to Requests 1-5, respectively. Client Device A submitted telemetry data 452 in association with Request 1. Client Device B submitted telemetry data 454 in association with Request 2. Client Device A submitted telemetry data 456 in association with Request 3. Client Device A submitted telemetry data 458 in association with Request 4. Client Device A submitted telemetry data 460 in association with Request 5. The telemetry data 452-460 for Requests 1-5 each include identifying signal values 462-470.

Identifying signal values 462, 466, 468, and 470 have matching values (a, b, c, d), indicating that telemetry data 452, 456, 458, and 460 were generated at the same client computing device (Client Device A). Identifying signal values 464 is different, indicating that telemetry data 454 was generated at a different client computing device (e.g. one of the client computing devices 102-104 or client computing device 502) other than Client Device A (Client Device B).

An IDSD corresponding to each of Requests 1-5 is generated based on the respective identifying signal values 462-468. For example, IDSD1 may simply be the set of corresponding identifying signal values (a, b, c, d), or may be a value calculated based on the set of corresponding identifying signal values. IDSD1 is generated based on identifying signal values 462 corresponding to Request 1. IDSD2 is generated based on identifying signal values 464 corresponding to Request 2. IDSD1 is generated based on identifying signal values 466 corresponding to Request 3. The IDSD for Request 3 is identical to the IDSD for Request 1 because telemetry data 452 and 456 were generated at the same client computing device (Client Device A), leading to matching identifying signal values 462 and 466. IDSD1 is generated based on identifying signal values 468 corresponding to Request 4. IDSD1 is generated based on identifying signal values 470 corresponding to Request 5.

The IDSD generated for an interaction identifies the client computing device (e.g. one of the client computing devices 102-104 or client computing device 502) involved in the interaction. For example, IDSD1 is generated from telemetry data 452, indicating that Request 1 originates from a first client computing device (Client Device A); IDSD2 is generated from telemetry data 454, indicating that Request 2 originates from a second client computing device (Client Device B); IDSD1 is generated from telemetry data 456, indicating that Request 3 originates from the first client computing device (Client Device A); IDSD1 is generated from telemetry data 458, indicating that Request 4 originates from the first client computing device (Client Device A); and IDSD1 is generated from telemetry data 460, indicating that Request 5 originates from the first client computing device (Client Device A).

IDSD as an Anonymized Client Id

FIG. 4C illustrates an example of UID data. In this example, the UID data 480 includes data describing one or more users that have interacted with Web Server System X and Web Server System Y from one or more client computing devices (e.g. one of the client computing devices 102-104 or client computing device 502). The UID data 480 may include a UID for each user, an encrypted UID for each user, multiple encrypted UIDs, or other data that uniquely identifies each user.

In some examples, the IDSD is used as the device ID in the UID data 480. For example, Client Device A has a device ID IDSD1, and Client Device B has a device ID IDSD 2. In some examples, the identifying signals used are selected to deidentify and/or anonymize the client computing devices. For example, it may be impossible to determine that Client Device A is represented by IDSD1 based on the collection of identifying signal values, even if the collection of identifying signal values can distinguish the client computing device from other client computing devices.

When determining whether to extend a session, the security server system (e.g. security server system 140 or security server system 540) may obtain an IDSD for a client computing device (e.g. one of the client computing devices 102-104 or client computing device 502), use the IDSD to look up the relevant authentication information the UID data 480, and makes a determination based on the relevant information obtained from the IDSD. Because the same IDSD is expected from signal values collected from the same client computing device at different times, the UID data 480 relevant to the client computing device is accessible using the IDSD generated at different times.

In some examples, when a security server system (e.g. security server system 140 or security server system 540) obtains and processes telemetry data 452-460 for interactions between client computing devices (e.g. client computing devices 102-104) and a plurality of web server systems (e.g. web server systems 112-114), the security server system (e.g. security server system 140 or security server system 540) makes any necessary updates to the UID data for the web server system. For example, a security server system (e.g. security server system 140 or security server system 540) may update the UID data 470 for Requests 1-5.

The security server system (e.g. security server system 140 or security server system 540) may monitor particular interaction types, such as login requests and/or other requests related to user authentication. In some examples, the UID data 480 is updated to include data describing one or more users that have successfully logged into Web Server System X and Web Server System Y.

Status Change

The security server system (e.g. security server system 140 or security server system 540) may determine that a client computing device (e.g. one of the client computing devices 102-104 or client computing device 502) is a single-user device by determining that an authenticated user is the only user who has had an authenticated session with a web server system (e.g. one of the web server systems 112-114 or web servers systems 512-514) from a computing device (e.g. one of the client computing devices 102-104 or client computing device 502) associated with the IDSD. For example, After Request 3, both device IDSD1 and device IDSD2 are single-user devices. After Request 4, device IDSD1 no longer a single-user device. In Request 4, a second user UID4 logs in from device IDSD1 to Web Server System X. Thus, the single-user status of device IDSD1 has changed.

In some examples, a current session involving an authenticated user at a second web server system (e.g. Web Server System Y) using the same client computing device (e.g. device IDSD1) is affected when the single-user status of the client computing device changes due to activity involving the same client computing device at a first web server system (e.g. Web Server System X). For example, when Request 3 occurs between Client Device A and Web Server System Y, the corresponding telemetry data generates a device ID IDSD1. The UID data 480 indicates that device IDSD1 is a single-user device at the time. However, when Request 5 occurs between the same user UID3, Client Device A, and Web Server System Y, the UID data 480 indicates that IDSD1 is no longer a single-user device because IDSD1 is associated with two user IDs (UID1, UID4) for Web Server System X.

In some examples, the security server system (e.g. security server system 140 or security server system 540) notifies Web Server System Y that the corresponding Client Device is no longer a single-user device due to activity at Web Server System X. For example, the security server system (e.g. security server system 140 or security server system 540) may notify the Web Server System Y about the status change using a push notification, such as by sending a message to the Web Server System Y when the status change occurs (e.g. after Request 4 is processed). Alternatively and/or in addition, the security server system may notify the Web Server System Y about the status change using a pull notification, such as by responding to a request for an update from the Web Server System Y.

Example System Architecture

A security server system (e.g. security server system 140 or security server system 540) may include one or more server systems that provide instrumentation code to client computing devices (e.g. client computing devices 102-104 or client computing device 502) and process telemetry data received from the client computing devices when the instrumentation code executes on the client computing devices.

Figure 5:
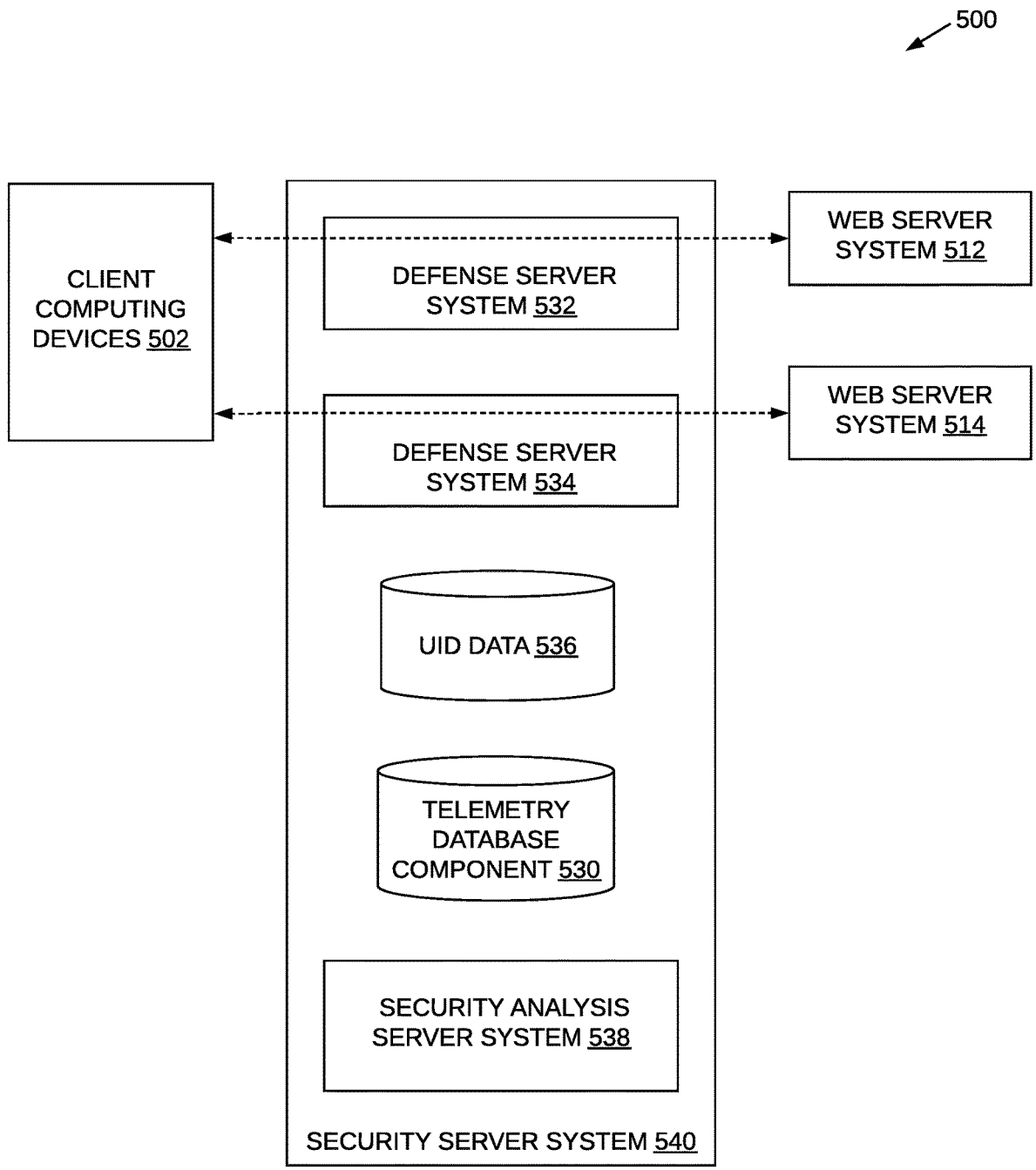
FIG. 5 is a block diagram of another exemplary computer system or environment that includes an example of another security server system or device that implements security measures for extended sessions using multi-domain data.

Referring more specifically to the example in FIG. 5, an exemplary computer system 500 that includes an example of another security server system 540 that implements security measures for extended sessions using multi-domain data including processing telemetry data received from the client computing devices when the instrumentation code executes on the client computing devices. Client computing devices (e.g. client computing 502 which represents one or more client computing devices) include a plurality of client computing devices that interact with one or more web server system 512-514 monitored by the security server system 540.

The security server system 540 may include one or more defense server systems 532-534. In this example, one of the defense server system 532-534 is associated with one of the web server systems 512-514. The defense server system 532-534 performs actions relating to transactions and/or other interactions between individual client computing device 502 and the associated one of the web server systems 512-514. Although FIG. 5 shows a one-to-one relationship between web server systems 512-514 and defense server systems 532-534, other configurations may be implemented. In this example, a defense server system 532 that is associated with a particular web server system 512 performs one or more actions during interactions between client computing device 502 and the particular web server system 512.

A defense server system 532-534 may provide instrumentation code for execution at the client computing device 502. In some examples, a defense server system 532-534 adds instrumentation code to, or otherwise integrates instrumentation code with web content served by the associated web server system 512-514 that can initiate a monitored interaction. For example, when a login request to one of the web server system 512-514 is a monitored interaction, one of the defense server systems 532-534 may provide instrumentation code to web content from the one of the web server systems 512-514 that includes a login interface that a user can use to initiate a login request from the corresponding client computing device. The instrumentation code executes with the web content when the web content executes on the client computing device (e.g. client computing device 502) that requested the web content. In some examples, when the monitored interaction is initiated at a client computing device (e.g. client computing device 502), the telemetry data is transmitted to the defense server system 532-534 associated with the corresponding web server system 512-514. For example, the telemetry data may be included with a request from the client computing device (e.g. client computing device 502) to the corresponding web server system 512-514. One or more defense server systems 532-534 may store UID data 536 for one or more associated web server systems 532-534.

Defense server systems 532-534 may be positioned in various network configurations with respect to the client computing device 502 and their associated web server system 512-514. For example a defense server system 532-534 may be deployed in an in-line configuration, an out-of-band configuration, or another configuration that allows the defense server system 532-534 to perform actions relating to requests, transactions and/or other interactions as they occur between client computing device 502 and one or more corresponding web server systems 512-514.

In an in-line configuration, a defense server system 532-534 may act as a reverse proxy server to an associated web server system 512-514 by intercepting one or more communications between the client computing device 502 and the associated web server system 512-514. As a reverse proxy server, the defense server system 532-534 retrieves resources, such as web content, on behalf of the clients of the associated web server systems 512-514. To the client computing device 502, the resources appear to originate from the associated web server system 512-514.

The defense server system 532-534 may be deployed locally to the web server system 512-514 or deployed over the Internet with respect to the web server system 512-514, such as in a cloud computing system managed by a security company, and/or in a computer system operated by a security company. For example, the defense server system 532-534 may intercept messages to the client computing device 502 and add instrumentation code for execution at the client computing device 502. As another example, the defense server system 532-534 may intercept requests to the associated web server system 512-514 that include collected telemetry data from the client computing device 502, process the telemetry data, and forward the requests to the associated web server system 512-514.

In an out-of-band configuration, a defense server system 532-534 may be involved in transactions and/or other interactions without intercepting communications between the client computing device 502 and the associated web server system 512-514. For example, a web server system 512-514 may obtain instrumentation code from the corresponding defense server system 532-534, provide the instrumentation code to the client computing device 502, receive telemetry data generated at the client computing device 502, and/or provide the corresponding defense server system 532-534 the telemetry data received from the client computing device 502. In response to a request from a web server system 512 or 514 regarding a particular client computing device (e.g. client computing device 502) with one or more device IDs, UIDs, telemetry and/or IDSDs, the security server system 540 may determine and respond with data indicating whether the client computing device (e.g. client computing device 502) appears to be a single-user device using one or more of the methods discussed herein.

Implementing Security Countermeasures

In some examples, the security server system 540 is operated by a security company or another entity that provides web security services. One or more web server systems 512-514 may be operated by security service customers, or entities that are provided security services by the security company. The security server system 540 protects the web server systems 512-514 of security service customers from attacks, such as attacks by malicious automated software executing on client computing device 502.

In some examples, the defense server systems 532-534 analyze transactions and/or other interactions between the client computing device 502 and the associated web server systems 512-514 to detect and mitigate attacks on the associated web server systems 512-514. For example, a defense server system 532-534 may collect and evaluate telemetry data corresponding to a transaction to determine whether the transaction is involved in an attack, such as whether a client computing device 502 involved in the transaction is controlled by automated malicious software. The defense server systems 532-534 may analyze telemetry data for an interaction to prevent an attack in real time, such as by such as blocking, redirecting, or flagging communications that correspond to the interaction.

When analyzing telemetry data to provide security services, the defense server systems 532-534 may store the telemetry data in the telemetry database component 530. Telemetry data stored in the telemetry database component 530, including any telemetry data collected to implement security services, is available for implementing security measures for extended sessions as described herein. In some examples, one or more signals collected to provide security services (e.g. signal values 402-418) are used as identifying signals (e.g. signal values 402-408, identifying signal values 420) to implement security measures for extended sessions.

The security server system 540 may include a security analysis server system 538 that evaluates telemetry data collected at the client computing device 502 to detect signatures or other properties of transactions initiated by malicious software executing on the client computing device(s) 502. The security analysis server system 538 may use telemetry data collected for multiple web server systems 512-514 to learn about new attacks and/or to deploy new countermeasures for real-time attack detection and prevention. For example, the security analysis server system 538 may update individual defense server systems 532-534 with the new countermeasures so that the defense server systems 532-534 may use the new security countermeasures to process transactions between associated web server systems 512-514 and client computing device(s) 502 in real time. The new countermeasures may include countermeasures that are usable to implement security measures for extended sessions and/or countermeasures that are usable to provide other security services.

Example Processes

Figure 6:
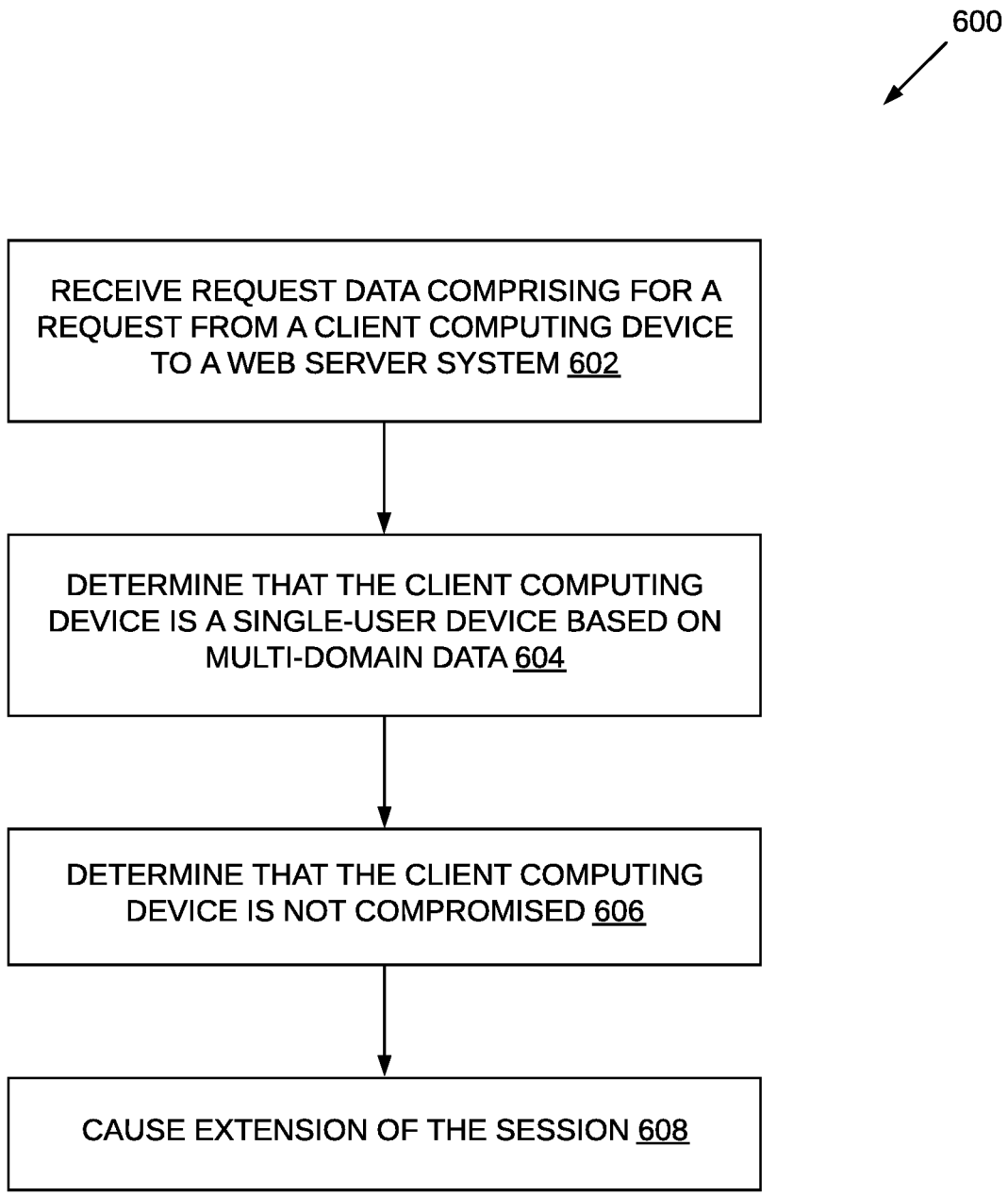
FIG. 6 is a flow chart of an example of another method for implementing security measures for extended sessions using multi-domain data.

FIG. 6 is a flow chart of an example of a method for implementing security measures for extended sessions using multi-domain data. Method 600 may be performed by one or more computing devices and/or processes thereof. For example, one or more steps of method 600 may be performed by a computer system, such as but not limited to computer system 700. In some examples, one or more steps of method 600 are performed by a security server system, which may include one or more defense server systems, companion server systems, and/or analysis server systems. Method 600 will be described with respect to security server system 140, but is not limited to performance by such and could for example be executed by security system 540.

At step 602, the security server system 140 receives request data for a request from a client computing device (e.g. one of the client computing devices 102-104) to a web server system (e.g. one of the web server systems 112-114), the request comprising a session identifier (ID) for a session between an authenticated user at one of the client computing devices 102-104 and the web server system (e.g. one of the web server systems 112-114).

At step 604, the security server system 140 determines, based on the request data, that the client computing device (e.g. one of the client computing devices 102-104) is a single-user device based on multi-domain data. In some examples, the security server system 140 determines that the client computing device (e.g. one of the client computing devices 102-104) is a single-user device by determining that only one authenticated user has logged in from the client computing device to each of a plurality of web server systems (e.g. web server systems 112-114) during a time period.

At step 606, the security server system 140 determines, based on the request data, that the client computing device (e.g. one of the client computing devices 102-104) is not compromised. In some examples, the security server system 140 determines that the client computing device (e.g. one of the client computing devices 102-104) is not compromised by determining that the client computing device is not controlled by automated software. In some examples, the security server system 140 determines that the client computing device (e.g. one of the client computing devices 102-104) is not compromised by providing instrumentation code that collects telemetry data at the client computing device when the instrumentation code is executed at the client computing device, receiving the telemetry data collected at the client computing device, and analyzing the telemetry data to determine whether the client computing device is compromised.

At step 608, in response to determining that the client computing device (e.g. one of the client computing devices 102-104) is a single-user device and that the client computing device is not compromised, the security server system 140 causes extension of the session between the authenticated user on the client computing device (e.g. one of the client computing devices 102-104) and the web server system (e.g. one of the web server systems 112-114). In some examples, the security server system 140 causes extension of the session by providing an indication to the web server system (e.g. one of the web server systems 112-114) that the client computing device is a single-user device that is not compromised. The web server system (e.g. one of the web server systems 112-114) may extend the session based on receiving the indication from the security server system 140. In some examples, extension of the session may include setting a new expiration date for an existing session cookie for the authenticated user at the client computing device (e.g. one of the client computing devices 102-104), issuing a new session cookie for the authenticated user at the client computing device with a new expiration date, and/or otherwise extending the session.

Implementation Mechanisms—Hardware Overview

According to one example, the techniques described herein are implemented by one or more special-purpose computing devices. The special-purpose computing devices may be hard-wired to perform one or more techniques described herein, including combinations thereof. Alternatively and/or in addition, the one or more special-purpose computing devices may include digital electronic devices such as one or more application-specific integrated circuits (ASICs) or field programmable gate arrays (FPGAs) that are persistently programmed to perform the techniques. Alternatively and/or in addition, the one or more special-purpose computing devices may include one or more general purpose hardware processors programmed to perform the techniques described herein pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices and/or any other device that incorporates hard-wired or program logic to implement the techniques.

Figure 7:
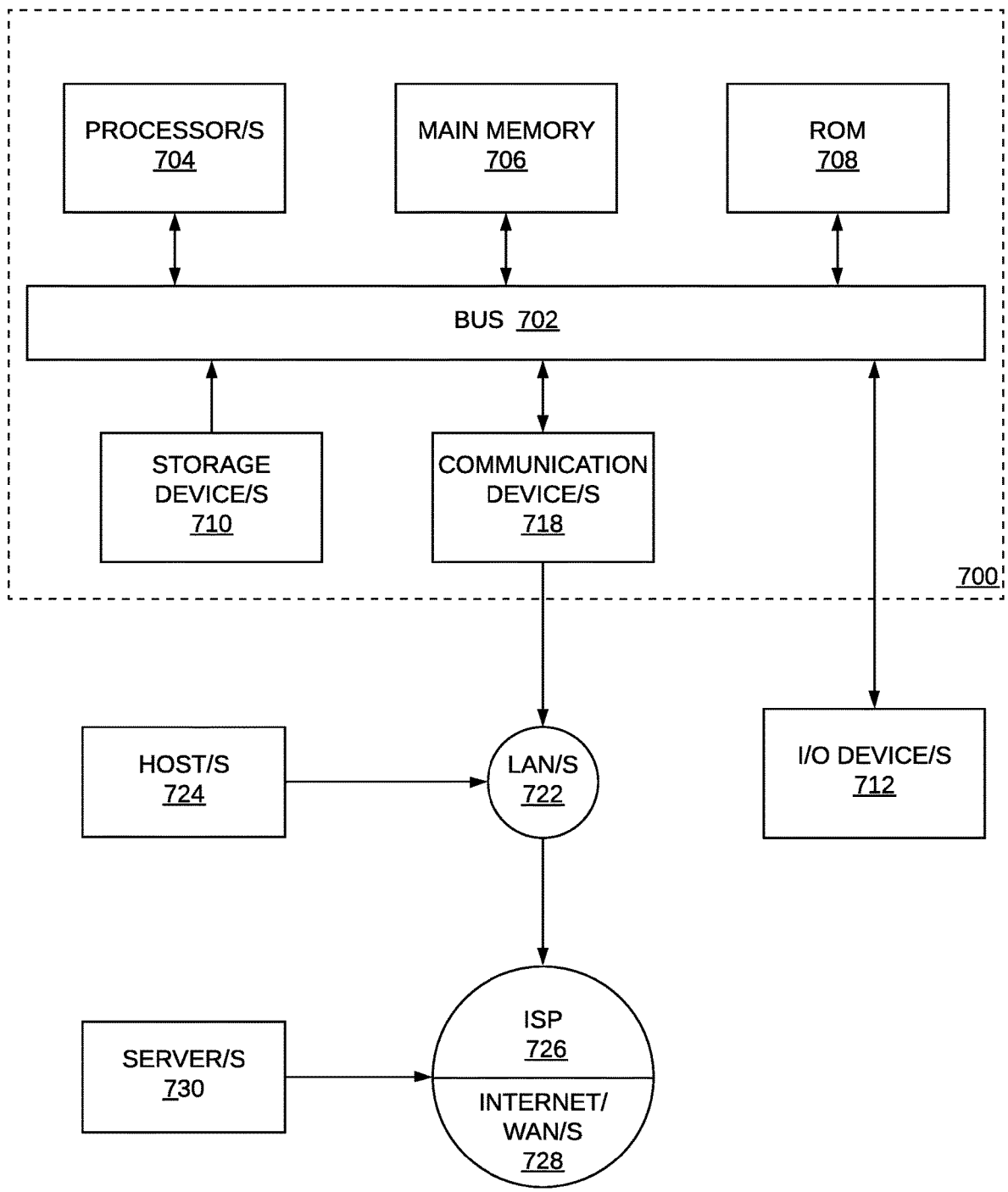
FIG. 7 is a block diagram of a computer system upon which an example of this technology may be implemented.

FIG. 7 illustrates a computer system 700 upon which an example of this technology may be implemented. In this example, the computer system 700 includes a bus 702 or other communication mechanism for communicating information, and one or more hardware processors 704 coupled with bus 702 for processing information, such as basic computer instructions and data. Hardware processor(s) 704 may include, for example, one or more general-purpose microprocessors, graphical processing units (GPUs), coprocessors, central processing units (CPUs), and/or other hardware processing units.

In this example, computer system 700 also includes one or more units of main memory 706 coupled to bus 702, such as random access memory (RAM) or other dynamic storage, for storing information and instructions to be executed by processor(s) 704. Main memory 706 may also be used for storing temporary variables or other intermediate information during execution of instructions to be executed by processor(s) 704. Such instructions, when stored in non-transitory storage media accessible to processor(s) 704, turn computer system 700 into a special-purpose machine that is customized to perform the operations specified in the instructions. In some examples, main memory 706 may include dynamic random-access memory (DRAM) (including but not limited to double data rate synchronous dynamic random-access memory (DDR SDRAM), thyristor random-access memory (T-RAM), zero-capacitor (Z-RAM™)) and/or non-volatile random-access memory (NVRAM).

Computer system 700 may further include one or more units of read-only memory (ROM) 708 or other static storage coupled to bus 702 for storing information and instructions for processor(s) 704 that are either always static or static in normal operation but reprogrammable. For example, ROM 708 may store firmware for computer system 700. ROM 708 may include mask ROM (MROM) or other hard-wired ROM storing purely static information, programmable read-only memory (PROM), erasable programmable read-only memory (EPROM), electrically-erasable programmable read-only memory (EEPROM), another hardware memory chip or cartridge, or any other read-only memory unit.

One or more storage devices 710, such as a magnetic disk or optical disk, is provided and coupled to bus 702 for storing information and/or instructions. Storage device(s) 710 may include non-volatile storage media such as, for example, read-only memory, optical disks (such as but not limited to compact discs (CDs), digital video discs (DVDs), Blu-ray discs (BDs)), magnetic disks, other magnetic media such as floppy disks and magnetic tape, solid state drives, flash memory, optical disks, one or more forms of non-volatile random access-memory (NVRAM), and/or other non-volatile storage media.

Computer system 700 may be coupled via bus 702 to one or more input/output (I/O) devices 712. For example, I/O device(s) 712 may include one or more displays for displaying information to a computer user, such as a cathode ray tube (CRT) display, a Liquid Crystal Display (LCD) display, a Light-Emitting Diode (LED) display, a projector, and/or any other type of display.

I/O device(s) 712 may also include one or more input devices, such as an alphanumeric keyboard and/or any other key pad device. The one or more input devices may also include one or more cursor control devices, such as a mouse, a trackball, a touch input device, or cursor direction keys for communicating direction information and command selections to processor 704 and for controlling cursor movement on another I/O device (e.g. a display). This input device typically has at degrees of freedom in two or more axes, (e.g. a first axis x, a second axis y, and optionally one or more additional axes z . . . ), that allows the device to specify positions in a plane. In some examples, the one or more I/O device(s) 712 may include a device with combined I/O functionality, such as a touch-enabled display.

Other I/O device(s) 712 may include a fingerprint reader, a scanner, an infrared (IR) device, an imaging device such as a camera or video recording device, a microphone, a speaker, an ambient light sensor, a pressure sensor, an accelerometer, a gyroscope, a magnetometer, another motion sensor, or any other device that can communicate signals, commands, and/or other information with processor(s) 704 over bus 702.

Computer system 700 may implement the techniques described herein using customized hard-wired logic, one or more ASICs or FPGAs, firmware or program logic which, in combination with the computer system causes or programs, causes computer system 700 to be a special-purpose machine. According to one example, the techniques herein are performed by computer system 700 in response to processor(s) 704 executing one or more sequences of one or more instructions contained in main memory 706. Such instructions may be read into main memory 706 from another storage medium, such as one or more storage device(s) 710. Execution of the sequences of instructions contained in main memory 706 causes processor(s) 704 to perform the process steps described herein. In alternative examples, hard-wired circuitry may be used in place of or in combination with software instructions.

In this example, computer system 700 also includes one or more communication interfaces 718 coupled to bus 702. Communication interface(s) 718 provide two-way data communication over one or more physical or wireless network links 720 that are connected to a local network 722 and/or a wide area network (WAN), such as the Internet. For example, communication interface(s) 718 may include an integrated services digital network (ISDN) card, cable modem, satellite modem, or a modem to provide a data communication connection to a corresponding type of telephone line. Alternatively and/or in addition, communication interface(s) 718 may include one or more of: a local area network (LAN) device that provides a data communication connection to a compatible local network 722; a wireless local area network (WLAN) device that sends and receives wireless signals (such as electrical signals, electromagnetic signals, optical signals or other wireless signals representing various types of information) to a compatible LAN; a wireless wide area network (WWAN) device that sends and receives such signals over a cellular network access a wide area network (WAN, such as the Internet 728); and other networking devices that establish a communication channel between computer system 700 and one or more LANs 722 and/or WANs.

Network link(s) 720 typically provides data communication through one or more networks to other data devices. For example, network link(s) 720 may provide a connection through one or more local area networks 722 (LANs) to one or more host computers 724 or to data equipment operated by an Internet Service Provider (ISP) 726. ISP 726 in turn provides connectivity to one or more wide area networks 728, such as the Internet. LAN(s) 722 and WAN(s) 728 both use electrical, electromagnetic or optical signals that carry digital data streams. The signals through the various networks and the signals on network link(s) 720 and through communication interface(s) 718 are example forms of transmission media, or transitory media.

The term "storage media" as used herein refers to any non-transitory media that stores data and/or instructions that cause a machine to operate in a specific fashion. Such storage media may include volatile and/or non-volatile media. Storage media is distinct from but may be used in conjunction with transmission media. Transmission media participates in transferring information between storage media. For example, transmission media includes coaxial cables, copper wire and fiber optics, including traces and/or other physical electrically conductive components that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its main memory 706 and send the instructions over a telecommunications line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 can send messages and receive data, including program code, through the network(s), network link 720 and communication interface 718. In the Internet example, one or more servers 730 might transmit signals corresponding to data or instructions requested for an application program executed by the computer system 700 through the Internet 728, ISP 726, local network 722 and a communication interface 718. The received signals may include instructions and/or information for execution and/or processing by processor(s) 704. Processor(s) 704 may execute and/or process the instructions and/or information upon receiving the signals by accessing main memory 706, or at a later time by storing them and then accessing them from storage device(s) 710.

OTHER ASPECTS OF DISCLOSURE

In the foregoing specification, examples of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A security server device comprising memory comprising programmed instructions stored thereon and one or more processors configured to be capable of executing the stored programmed instructions to:

receive request data for a request from a client to a web server system, the request comprising a session identifier (ID) for a session between an authenticated user and the web server system;

determine when the client is a single-user device based on the request data and multi-domain data, wherein determining that the client is a single-user device comprises determining that only one authenticated user per web server system has logged in from the client to each of a plurality of web server systems during a time period;

determine when the client is compromised based on the request data; and in response to the determinations that the client is a single-user device and is not compromised, cause extension of the session between the authenticated user on the client and the web server system.

2. The device of claim 1, wherein for the determine when the client is compromised, the processors are further configured to be capable of executing the stored programmed instructions to determine that the client is not controlled by automated software.

3. The device of claim 1, wherein for the cause the extension of the session, the processors are further configured to be capable of executing the stored programmed instructions to:

set a new expiration date for an existing session cookie for the authenticated user at the client; or issue a new session cookie for the authenticated user at the client with a new expiration date.

4. The device of claim 1, wherein the processors are further configured to be capable of executing the stored programmed instructions to:

issue a cookie to the client comprising:

a device ID and store, in association with the device ID, user ID data for any authenticated users that successfully log in to web server system from the client; or an encrypted user ID data for each authenticated user that successfully logs in to the web server system from the client, wherein the request data includes the cookie and wherein for the determine when the client is the single-user device, the processors are further configured to be capable of executing the stored programmed instructions to:
use the device ID in the request data to look up the user ID data associated with the web server system; or
analyze the encrypted user ID data.

5. The device of claim 1, wherein the processors are further configured to be capable of executing the stored programmed instructions to:
provide, for the client, instrumentation code that collects telemetry data at the client when the instrumentation code is executed at the client, the telemetry data comprising identifying signal values;
receive the telemetry data collected at the client;
generate an IDSD associated with the client based on the identifying signal values;
wherein for the determine when the client is the single-user device, the processors are further configured to be capable of executing the stored programmed instructions to:
determine that only one authenticated user has logged in from the client associated with the IDSD to the web server system during the time period.

6. A method implemented by a security system comprising one or more security server devices, web server systems, or client computing devices, the method comprising:
receiving request data for a request from a client to a web server system, the request comprising a session identifier (ID) for a session between an authenticated user and the web server system;
determining when the client is a single-user device based on the request data and multi-domain data, wherein determining that the client is a single-user device comprises determining that only one authenticated user per web server system has logged in from the client to each of a plurality of web server systems during a time period;
determining when the client is compromised based on the request data; and
in response to the determinations that the client is a single-user device and is not compromised, causing extension of the session between the authenticated user on the client and the web server system.

7. The method of claim 6, wherein the determining when the client is compromised further comprises
determining that the client is not controlled by automated software.

8. The method of claim 6, wherein the causing the extension of the session further comprises:
setting a new expiration date for an existing session cookie for the authenticated user at the client; or
issuing a new session cookie for the authenticated user at the client with a new expiration date.

9. The method of claim 6, further comprising:
issuing a cookie to the client comprising:
a device ID and store, in association with the device ID, user ID data for any authenticated users that successfully log in to web server system from the client; or
an encrypted user ID data for each authenticated user that successfully logs in to the web server system from the client,
wherein the request data includes the cookie and wherein the determining when the client is the single-user device further comprises:

using the device ID in the request data to look up the user ID data associated with the web server system; or
analyzing the encrypted user ID data.

10. The method of claim 6, further comprising:
providing, for the client, instrumentation code that collects telemetry data at the client when the instrumentation code is executed at the client, the telemetry data comprising identifying signal values;
receiving the telemetry data collected at the client;
generating an IDSD associated with the client based on the identifying signal values;
wherein the determining when the client is the single-user device further comprises:
determining that only one authenticated user has logged in from the client associated with the IDSD to the web server system during the time period.

11. A non-transitory computer readable medium having stored thereon instructions comprising executable code that, when executed by one or more processors, causes the processors to:
receive request data for a request from a client to a web server system, the request comprising a session identifier (ID) for a session between an authenticated user and the web server system;
determine when the client is a single-user device based on the request data and multi-domain data, wherein determining that the client is a single-user device comprises determining that only one authenticated user per web server system has logged in from the client to each of a plurality of web server systems during a time period;
determine when the client is compromised based on the request data; and
in response to the determinations that the client is a single-user device and is not compromised, cause extension of the session between the authenticated user on the client and the web server system.

12. The non-transitory computer readable medium of claim 11, wherein for the determine when the client is compromised, the executable code, when executed by the processors further causes the processors to
determine that the client is not controlled by automated software.

13. The non-transitory computer readable medium of claim 11, the executable code, when executed by the processors further causes the processors to:
set a new expiration date for an existing session cookie for the authenticated user at the client; or
issue a new session cookie for the authenticated user at the client with a new expiration date.

14. The non-transitory computer readable medium of claim 11, the executable code, when executed by the processors further causes the processors to:
issue a cookie to the client comprising:
a device ID and store, in association with the device ID, user ID data for any authenticated users that successfully log in to web server system from the client; or
an encrypted user ID data for each authenticated user that successfully logs in to the web server system from the client,
wherein the request data includes the cookie and wherein for the determine when the client is the single-user device, the processors are further configured to be capable of executing the stored programmed instructions to:

use the device ID in the request data to look up the user ID data associated with the web server system; or analyze the encrypted user ID data.

15. The non-transitory computer readable medium of claim 11, the executable code, when executed by the processors further causes the processors to:

provide, for the client, instrumentation code that collects telemetry data at the client when the instrumentation code is executed at the client, the telemetry data comprising identifying signal values;

receive the telemetry data collected at the client;

generate an IDSD associated with the client based on the identifying signal values;

wherein for the determine when the client is the single-user device, the processors are further configured to be capable of executing the stored programmed instructions to:

determine that only one authenticated user has logged in from the client associated with the IDSD to the web server system during the time period.

16. A security system, comprising one or more security server devices, server devices, or clients with memory comprising programmed instructions stored thereon and one or more processors configured to be capable of executing the stored programmed instructions to:

receive request data for a request from a client to a web server system, the request comprising a session identifier (ID) for a session between an authenticated user and the web server system;

determine when the client is a single-user device based on the request data and multi-domain data, wherein determining that the client is a single-user device comprises determining that only one authenticated user per web server system has logged in from the client to each of a plurality of web server systems during a time period;

determine when the client is compromised based on the request data; and in response to the determinations that the client is a single-user device and is not compromised, cause extension of the session between the authenticated user on the client and the web server system.

17. The system of claim 16, wherein for the determine when the client is compromised, the processors are further configured to be capable of executing the stored programmed instructions to determine that the client is not controlled by automated software.

18. The system of claim 16, wherein for the cause the extension of the session, the processors are further configured to be capable of executing the stored programmed instructions to:

set a new expiration date for an existing session cookie for the authenticated user at the client; or issue a new session cookie for the authenticated user at the client with a new expiration date.

19. The system of claim 16, wherein the processors are further configured to be capable of executing the stored programmed instructions to:

issue a cookie to the client comprising:

a device ID and store, in association with the device ID, user ID data for any authenticated users that successfully log in to web server system from the client; or an encrypted user ID data for each authenticated user that successfully logs in to the web server system from the client, wherein the request data includes the cookie and wherein for the determine when the client is the single-user device, the processors are further configured to be capable of executing the stored programmed instructions to:

use the device ID in the request data to look up the user ID data associated with the web server system; or analyze the encrypted user ID data.

20. The system of claim 16, wherein the processors are further configured to be capable of executing the stored programmed instructions to:

provide, for the client, instrumentation code that collects telemetry data at the client when the instrumentation code is executed at the client, the telemetry data comprising identifying signal values;

receive the telemetry data collected at the client;

generate an IDSD associated with the client based on the identifying signal values;

wherein for the determine when the client is the single-user device, the processors are further configured to be capable of executing the stored programmed instructions to:

determine that only one authenticated user has logged in from the client associated with the IDSD to the web server system during the time period.

* * * * *